United States Patent Office

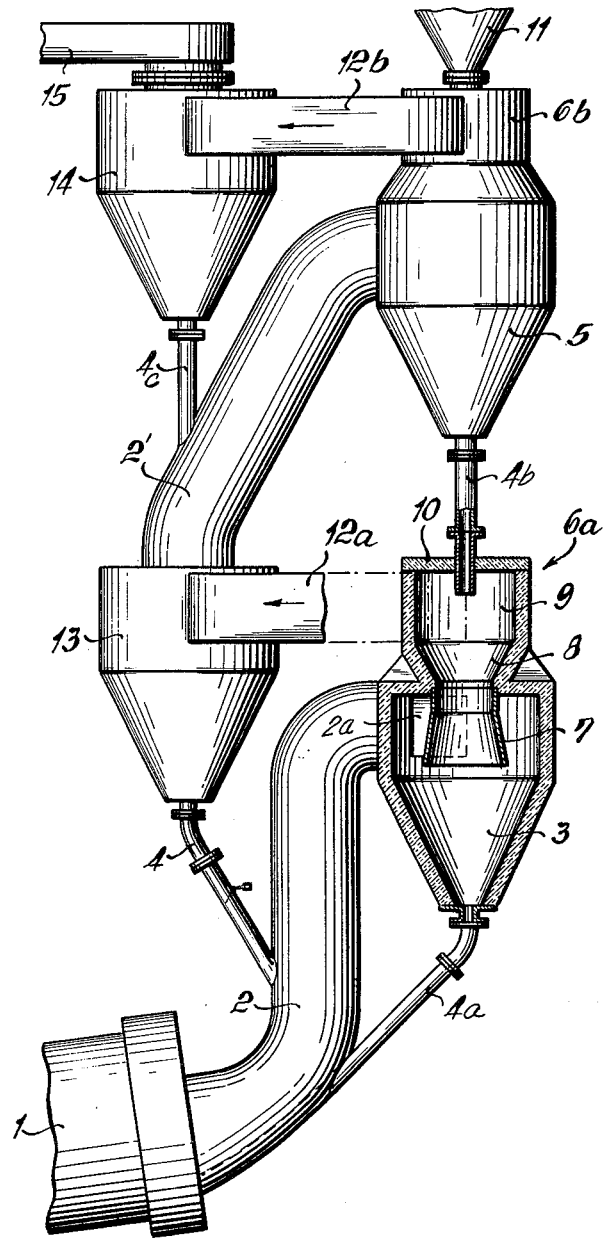

3,207,494
Patented Sept. 21, 1965

3,207,494
APPARATUS FOR THE PREHEATING OF RAW CEMENT MATERIAL
Heinz Jäger, Bochum, Germany, assignor to Wedag Westfalia Dinnendahl Groppel Aktiengesellschaft, Bochum, Germany, a corporation of Germany
Filed Dec. 12, 1963, Ser. No. 330,066
Claims priority, application Germany, Dec. 13, 1962, W 33,512
9 Claims. (Cl. 263—21)

This invention relates to apparatus for the preheating of pulverulent raw cement material, and more particularly to such apparatus having a number of cyclone separators mounted in tandem and/or mounted in stages, one above the other, the separators being traversed in sequence by the hot exhaust gases of a furnace, particularly of a rotary kiln, the direction of flow of the gases being in countercurrent flow to the direction of travel of the charged raw material to be introduced into the kiln. The raw material which separates out within the cyclones falls in a downward direction, and in each case is delivered by means of the discharge pipe of a given cyclone to the next cyclone stage ahead, and whose hot exhaust pipe duct is connected so as to discharge tangentially into the aforementioned given cyclone. A heat exchange occurs between the exhaust gas of the rotary kiln travelling in a generally upward direction through the series of cyclone separators and the pulverulent raw material flowing in a generally downward direction. This heat exchange takes place predominantly inside the cyclones in the case of the conventional preheaters, and only to a relatively slight degree in the pipes or ducts which join together the cyclones, because of the smaller cross section of the flow in these pipes and ducts.

In order to compensate for this relatively slight heat exchange in the ducts joining conventional cyclone separators, resort has been had heretofore to the mounting of baffle plates or distributor plates inside of the hot gas ducts, at a slight distance from the lower apertures of the vertical gas intake pipe. These distributor or baffle plates, however, merely serve the purpose of fanning out the material in the stream of gas flowing in opposite direction to that of the raw material feed. Consequently, these distributor or baffle plates have proved inefficient and unsatisfactory because they remain without any effect on the time-span during which the raw material remains inside of the preheating apparatus in contact with the hot gas, and thus remain without effect on the degree of heat utilization or efficiency of preheating. Other apparatus suggested for the same purpose, with a somewhat greater degree of success, provides for an increased number of cyclone separators connected in tandem. However, this latter proposal is associated with a considerable increase in cost of the installation.

It is therefore an object of the present invention to overcome the above-mentioned disadvantages of the prior art, and to provide preheating apparatus which will achieve optimal heat exchange between hot gases and pulverulent cement raw material, with simplicity and inexpensiveness of design and low cost of installation and maintenance.

It is another object of the invention to provide an inexpensive and easily maintained apparatus for more efficiently preheating powdered raw cement material by means of hot waste kiln exhaust gases.

A further object of the invention is to provide an eddy chamber associated with a cyclone separator for bringing hot gases into heat-exchanging contact with pulverulent material.

Still another object of the invention is to provide a preheating apparatus for efficiently raising the temperature of raw cement material being fed to a kiln while simultaneously reducing the outlet temperature of hot waste gases issuing from the kiln.

To these ends, and in accordance with a preferred embodiment of the invention, an eddy chamber is provided on the cyclone separator which is first in the direction of flow of the kiln exhaust gases. A similar eddy chamber is also mounted on all of the other cyclones mounted above this first cyclone. This eddy chamber of a respective cyclone is arranged to communicate with its associated cyclone by means of an immersion pipe and also to communicate by means of its exhaust duct with the cyclone next in sequence. The discharge pipe of the cyclone mounted next above is arranged to discharge its separated-out powdered material into the exhaust duct of the cyclone below. With this arrangement, it has been found that an intimate mixing and contacting, and an intensive heat exchange, takes place inside of the eddy chamber between the exhaust gases and the raw material, and the raw material which passes down through the immersion pipe does not reach or pass into the main chamber of the associated cyclone. The duration or time-span over which the raw material remains in the eddy chamber will be governed from case to case by the particular shape and dimensions of the respective eddy chamber, by the cross-section of the exhaust duct and immersion pipe, by the exhaust gas temperature prevailing, as well as by the quantities of exhaust gas and raw material.

The eddy chamber, according to a further feature of the invention, preferably comprises a cylindrical upper portion, which approximates or is slightly smaller than the diameter of the associated cyclone, and a conical lower portion which extends downwardly from the cylindrical upper portion and which is connected to an immersion duct extending into the main body of the cyclone down past the tangential hot gas inlet of the latter. The cylindrical portion of the eddy chamber is suitably sealed off by means of a top cover or lid, made removable for the purpose of ready access for inspection, control and maintenance of the interior of the chamber. Passing transversely through this lid is the material discharge pipe of another cyclone which is disposed directly above the eddy chamber of the first cyclone, the discharge pipe projecting more or less into the eddy chamber. The exhaust duct which conveys the gases from the eddy chamber into the next ensuing cyclone is mounted on the cylindrical jacket of the eddy chamber, either radially or tangentially. However, it is also feasible for the exhaust pipe from the eddy chamber to surround the lower portion of the outlet duct in an annular form and to run upwardly in a vertical direction and then more or less horizontally so as to lead to the next cyclone.

According to further features of the invention, a number of exhaust gas ducts are provided for interconnecting a centrally located eddy chamber with a corresponding number of cyclones arranged around the central eddy chamber and located at the same elevation and connected in parallel with respect to each other.

The foregoing and other objects, features and many of the attendant advantages of this invention will be readily appreciated as the same becomes better understood by reference to the following detailed description in conjunction with one embodiment of an apparatus according to the invention illustrated by way of the example on the accompanying drawing, in which:

The figure illustrates the arrangement of four heat exchange cyclones, at least two of which contain added eddy chambers, one of the cyclones and its associated eddy chamber being illustrated in vertical longitudinal section.

As shown in the drawing, a rotary furnace or kiln 1 is fed by powdered raw cement material from a feed pipe 4 and from a feed pipe 4a, the material from the latter passing via duct 2. Hot exhaust gases issue from the rotary kiln 1 and flow generally upwardly through the duct 2. The hot gas duct 2 carrying the exhaust gases is connected at its outlet 2a tangentially into the cyclone separator 3, which is first in a series of separators along the flow path of the hot exhaust gas. The discharge pipe 4a connected to the bottom of this cyclone 3 conveys the raw material and the dust separated out in cyclone 3 down into the rotary kiln 1. Mounted on cyclone 3 as well as on cyclone 5 which is lodged directly above it, are respective eddy chamber 6a and 6b, arranged in communication at their lower end with the respective associated cyclones 3 and 5.

The eddy chambers 6a, 6b comprise preferably a cylindrical upper portion 9 which approximates the diameter of the associated cyclone 3, and a conical lower portion 8 connected to and extending downwardly from cylindrical portion 9. An immersion duct 7 is connected to and extends downwardly from the conical portion 8. The portion of duct 7 at its connection to the frusto-conical portion 8 is of the same diameter as the constricted lower opening of conical portion 8. The immersion duct 7 then preferably flares out slightly in the downward direction and extends to below the level of tangential inlet 2a, terminating within the cylindrical portion of cyclone 3. In this manner, the eddy chambers 6a, 6b communicate at their lower ends with the cyclone 3 or 5 through their respective immersion ducts 7. A removable cover or lid 10 is provided to seal off the upper portion of the eddy chamber.

Through a central opening in the lid 10 the powdered material is introduced to the eddy chamber, either through a discharge pipe 4b which extends from the upper cyclone 5 into the chamber 6a, or from a feed hopper 11 with a corresponding discharge pipe extending into chamber 6b.

Exhaust ducts 12a and 12b are provided to convey the hot gases out of the eddy chambers 6a and 6b, respectively. The exhaust ducts 12a, 12b are respectively connected tangentially with the eddy chambers 6a and 6b and likewise are connected tangentially into the next ensuing cyclones 13 and 14, respectively. The discharge pipe 4 of cyclone 13 extends into the hot gas duct 2 extending between the kiln and the first cyclone 3, while the discharge pipe 4c carrying the discharged cement raw material from cyclone 14 feeds into the hot gas duct 2′ extending upwardly from cyclone 13 into cyclone 5.

Operation of the apparatus is as follows:

The hot exhaust gases from the rotary kiln 1 flow upwardly through the exhaust duct 2, where they come into contact with powdered raw material issuing downwardly from discharge pipe 4. The hot exhaust gases continue generally upwardly, passing through inlet 2a into the main chamber of cyclone 3 and around the outside of immersion duct 7, discharging entrained powder downwardly by cyclone action. The hot gases then flow upwardly through immersion duct 7, through frusto-conical section 8 and cylindrical section 6a of the eddy chamber in countercurrent flow to the raw material issuing downwardly from discharge pipe 4b. The gases then flow out of the eddy chamber through duct 12a into cyclone 13, and from there are exhausted upwardly through hot gas duct 2′ in counterflow to the raw material descending from discharge pipe 4c of cyclone 14. The hot gases from duct 2′ then enter cyclone 5 in a manner similar to that above described relative to cyclone 3, and then issue through duct 12b into cyclone 14, where raw cement material is separated out and the exhaust gases issue through the immersion duct of cyclone 14 into dust outlet duct 15 and pass to conventional dust-extracting apparatus (not shown) and from there to the atmosphere.

The cement raw material is charged through the feed hopper 11 into the eddy chamber 6b of cyclone 5, and is conveyed, at least partially, by the upwardly flowing hot gases through the exhaust pipe 12b to cyclone 14 after being subjected to a vigorous whirling action in the eddy chamber 6b by the hot gases. The raw material separated out in cyclone 14 travels by way of the discharge pipe 4c into the hot gas duct 2′. It is there entrained by the exhaust gas stream travelling upwardly through duct 2′ and is delivered tangentially to cyclone 5, passing into the main chamber of the cyclone around the downwardly extending immersion duct 7, as above described relative to cyclone 3.

In this manner, the raw material which enters at hopper 11 is heated stepwise and successively in the eddy chambers and in the respective cyclones, and is carried downward by gravity and laterally by the flowing hot gas stream. The raw cement material thus reaches the kiln in preheated condition, while the hot kiln gases, because of the advantage of the relative long stay in the eddy chambers, have simultaneously yielded up a great portion of their heat before passing out of the system.

It will be obvious to those skilled in the art, upon studying this disclosure, that devices according to my invention can be modified in various respects and hence may be embodied in apparatus other than as particularly illustrated and described herein, without departing from the essential features of my invention and within the scope of the claims annexed hereto.

I claim:

1. An apparatus for preheating pulverulent raw cement material, comprising a plurality of sequentially arranged cyclone separators, an eddy chamber on the top of at least said one of said separators, means for supplying material to be preheated through said eddy chamber to said one separator, hot gas duct means for delivering hot gases to said separators and including hot gas inlet means in said one separator, said eddy chamber including a lower portion connected with said one separator, an immersion pipe in said one cyclone separator, said immersion pipe being connected to said portion and extending downwardly into said one separator to below the level of said inlet means so as to form a path for hot gases from said inlet means down past the outside of said immersion pipe and up through said immersion pipe and a path for material to be preheated in opposition to the path for hot gases.

2. An apparatus for preheating pulverulent raw cement material, comprising a plurality of sequentially arranged cyclone separators, an eddy chamber on the top of at least said one of said separators, means for supplying material to be preheated through said eddy chambers to said separators, hot gas duct means for delivering hot gases to said separators and including hot gas inlet means in said one separator, said eddy chamber including a downwardly tapered portion connected with said one separator, an upwardly tapering immersion pipe in said one cyclone separator, said immersion pipe being connected to said tapered portion and extending downwardly into said one separator to below the level of said inlet means so as to form a path for hot gases from said inlet means down past the outside of said immersion pipe and up through said immersion pipe and a path for material to be preheated in opposition to the path for hot gases.

3. An apparatus for preheating pulverulent raw cement material, comprising a plurality of sequentially arranged cyclone separators, an eddy chamber on the top of at least said one of said separators, means for supplying material to be preheated to said eddy chamber, hot gas duct means for delivering hot gases to said separators and including hot gas inlet means in said one separator, said eddy chamber having a cylindrical portion including a downwardly tapered portion connected with said one separator, an upwardly tapering immersion pipe in said one separator, said immersion pipe being connected to said tapered portion and extending downwardly into said one separator to below the level of said inlet means so as to form a path for hot gases from said inlet means down past the outside of said immersion pipe and up through said immersion pipe and a path for material to be preheated in opposition to the path for hot gases, and exhaust pipe means connecting said eddy chamber with another of said separators.

4. An apparatus according to claim 3 including material discharge means for discharging preheated material from said one separator into said hot gas duct means.

5. An apparatus for preheating pulverulent raw cement material, comprising a plurality of sequentially arranged cyclone separators, an eddy chamber on the top of at least one of said separators, means for supplying material to be preheated to said eddy chamber, hot gas duct means for delivering hot gases to said separators and including hot gas inlet means in said one separator, said eddy chamber including a downwardly tapered portion connected with said one separator, an upwardly tapering immersion pipe in said one separator, said immersion pipe being connected to said tapered portion and extending downwardly into said one separator to below the level of said inlet means so as to form a path for hot gases from said inlet means down past the outside of said immersion pipe and up through said immersion pipe and a path for material to be preheated in opposition to the path for hot gases, said eddy chamber including a lid, said lid having a central aperture therein, said means for supplying material to be preheated extending through said aperture.

6. An apparatus according to claim 5 including exhaust pipe means connecting said eddy chamber with another of said separators, and material discharge means for discharging preheated material vertically into said hot gas duct means and vertically above said other separator.

7. An apparatus for preheating pulverulent raw cement material, comprising a plurality of sequentially arranged cyclone separators, an eddy chamber on the top of at least one of said separators, means for supplying material to be preheated to said eddy chamber in a vertical direction, hot gas duct means for delivering hot gases to said separators and including hot gas inlet means in said one separator, said eddy chamber having a cylindrical portion and including a downwardly tapered portion connected with said one separator, an upwardly tapering immersion pipe in said one separator, said immersion pipe being connected to said tapering portion and extending downwardly into said one separator to below the level of said inlet means so as to form a path for hot gases from said inlet means down past the outside of said immersion pipe and up through said immersion pipe and a generally vertical path for material to be preheated in opposition to the path for hot gases, and exhaust pipe means connecting said eddy chamber with another of said separators, said exhaust pipe being joined tangentially to said cylindrical portion of said eddy chamber.

8. An apparatus for preheating pulverulent raw cement material comprising a plurality of sequentially arranged separators, an eddy chamber on the top of at least one of said separators, means for supplying material to be preheated to said eddy chamber in a vertical direction, hot gas duct means for delivering hot gases to said separators and including hot gas inlet means in said one separator, said eddy chamber having a cylindrical portion and including a downwardly tapered portion connected with said one separator, an upwardly tapering immersion pipe in said one separator, said immersion pipe being connected to said tapered portion and extending downwardly into said one separator to below the level of said inlet means so as to form a path for hot gases from said inlet means down past the outside of said immersion pipe and up through said immersion pipe and a generally vertical path for material to be preheated in opposition to the path for hot gases, a number of others of said separators being mounted at substantially the same elevation as said one separators, and a plurality of exhaust pipes connected to said others of said separators and being joined tangentially to said cylindrical portion so as to connect said eddy chamber with the others of said separators.

9. An apparatus for preheating pulverulent raw cement material, comprising a plurality of sequentially aranged cyclone separators, an eddy chamber on the top of at least one of said separators, means for supplying material to be preheated to said eddy chamber, hot gas duct means for delivering hot gases to said separators and including hot gas inlet means in said one separator, said eddy chamber having a cylindrical portion and including a downwardly tapered portion connected with said one separator, an upwardly tapering immersion pipe in said one separator, said immersion pipe being connected to said tapered portion and extending downwardly into said one separator to below the level of said inlet means so as to form a path for hot gases from said inlet means down past the outside immersion pipe and up through said immersion pipe and a path for material to be preheated in opposition to the path for hot gases, a number of others of said separators being mounted at substantially the same elevation as said one separator, and a plurality of exhaust pipes connected to said others of said separators and being joined tangentially to said cylindrical portion so as to connect said eddy chamber with the others of said separators, and material discharge means for discharging preheated material downwardly from said one separator and from at least one of said others of said separators into said hot gas duct means.

References Cited by the Examiner

UNITED STATES PATENTS

| 2,659,587 | 11/53 | Bowen | 263—21 |
| 2,797,076 | 6/57 | Muller | 263—32 |

FOREIGN PATENTS

| 1,107,037 | 7/55 | France. |
| 532,626 | 8/31 | Germany. |

CHARLES SUKALO, *Primary Examiner.*

JOHN J. CAMBY, *Examiner.*